US012574912B2

(12) United States Patent     (10) Patent No.:   US 12,574,912 B2

Rosa et al.     (45) Date of Patent:    Mar. 10, 2026

(54) DYNAMIC ADAPTATION OF FREQUENCY RESOURCES FOR UPLINK TRANSMISSIONS WITH FLEXIBLE FREQUENCY DIVISION DUPLEXING

(71) Applicant: Nokia Technologies Oy, Espoo (FI)

(72) Inventors: Claudio Rosa, Randers (DK); Klaus Ingemann Pedersen, Aalborg (DK); Nuno Manuel Kiilerich Pratas, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 448 days.

(21) Appl. No.: 18/024,060

(22) PCT Filed: Sep. 1, 2020

(86) PCT No.: PCT/EP2020/074329

§ 371 (c)(1),
(2) Date: Mar. 1, 2023

(87) PCT Pub. No.: WO2022/048729

PCT Pub. Date: Mar. 10, 2022

(65) Prior Publication Data

US 2023/0269714 A1     Aug. 24, 2023

(51) Int. Cl.
*H04W 72/0453*    (2023.01)
*H04L 5/00*    (2006.01)
*H04L 5/14*    (2006.01)

(52) U.S. Cl.
CPC ....... *H04W 72/0453* (2013.01); *H04L 5/0094* (2013.01); *H04L 5/1469* (2013.01)

(58) Field of Classification Search
CPC ......................... H04W 72/0453; H04W 72/21; H04L 5/0094; H04L 5/1469; H04L 5/0007; H04L 27/2602; H04L 5/0044; H04L 5/0064
See application file for complete search history.

(56) References Cited

U.S. PATENT DOCUMENTS

| | | |
|---|---|---|
| 2017/0048740 A1 | 2/2017 | Yang et al. |
| 2018/0160417 A1 | 6/2018 | Lo et al. |
| 2021/0152418 A1* | 5/2021 | Abdelghaffar ....... H04B 7/0602 |
| 2021/0329646 A1* | 10/2021 | Fakoorian ............. H04W 72/53 |
| 2021/0377926 A1* | 12/2021 | Li ........................ H04L 5/0053 |
| 2022/0014298 A1* | 1/2022 | Ibrahim ............... H04B 17/345 |
| 2022/0014342 A1* | 1/2022 | Abotabl ................ H04L 5/1423 |

* cited by examiner

*Primary Examiner* — Yu-Wen Chang

(74) *Attorney, Agent, or Firm* — Carter, DeLuca & Farrell LLP

(57) ABSTRACT

A network node allocates primary frequency resources and at least one secondary frequency resource to a user equipment (UE) within a dynamically changing bandwidth (BW) of a cell served by the network node. The network node further configures the UE to use the primary frequency resources for an UL transmission when the primary frequency resources fall within an UL part of the BW, and to use the secondary frequency resource for the UL transmission when the primary frequency resources fall, at least partly, within a downlink (DL) part and/or a Guard Band (GB) of the BW, and/or fall, at least partly, outside the BW. The UE may dynamically, based on such configuration from the network node, adapt its resource allocation to perform the UL transmission even if the primary frequency resources are not fully within the UL part of the BW in a current time resource.

2 Claims, 7 Drawing Sheets

S302

300

Generating configuration information for a UE such that it indicates primary frequency resources and at least one secondary frequency resource which are allocated to the UE within a dynamically changing BW of a cell, and it further indicates the following conditions: (i) the primary frequency resources are to be used by the UE for an UL transmission whenever the primary frequency resources fall within an UL part of the BW; and (ii) the secondary frequency resource(s) is(are) to be used by the UE for the UL transmission whenever the primary frequency resources fall, at least partly, within a DL part and/or a GB of the BW, and/or fall, at least partly, outside the BW

S304

Transmitting the configuration information to the UE

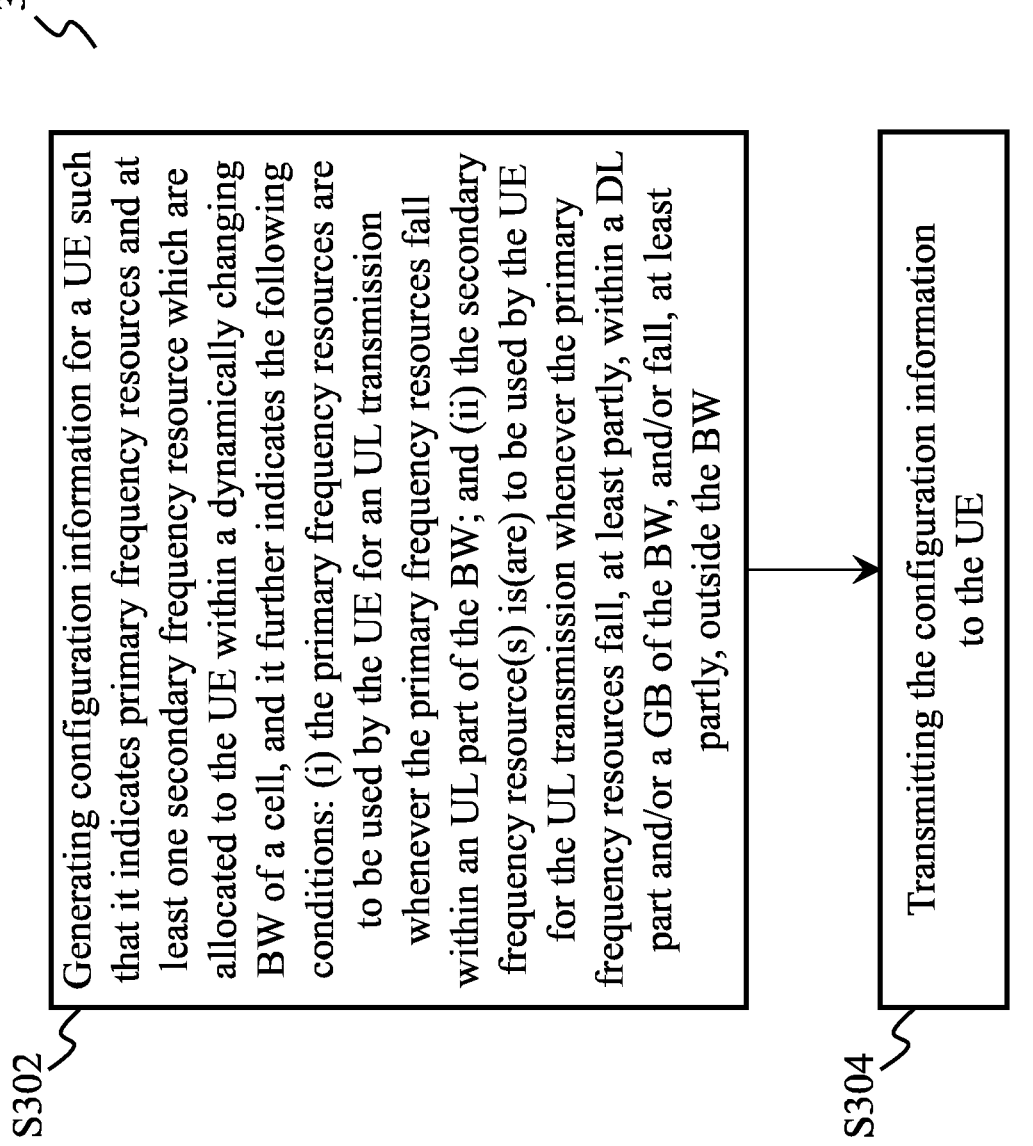

300

S302

Generating configuration information for a UE such that it indicates primary frequency resources and at least one secondary frequency resource which are allocated to the UE within a dynamically changing BW of a cell, and it further indicates the following conditions: (i) the primary frequency resources are to be used by the UE for an UL transmission whenever the primary frequency resources fall within an UL part of the BW; and (ii) the secondary frequency resource(s) is(are) to be used by the UE for the UL transmission whenever the primary frequency resources fall, at least partly, within a DL part and/or a GB of the BW, and/or fall, at least partly, outside the BW

S304

Transmitting the configuration information to the UE

FIG. 3

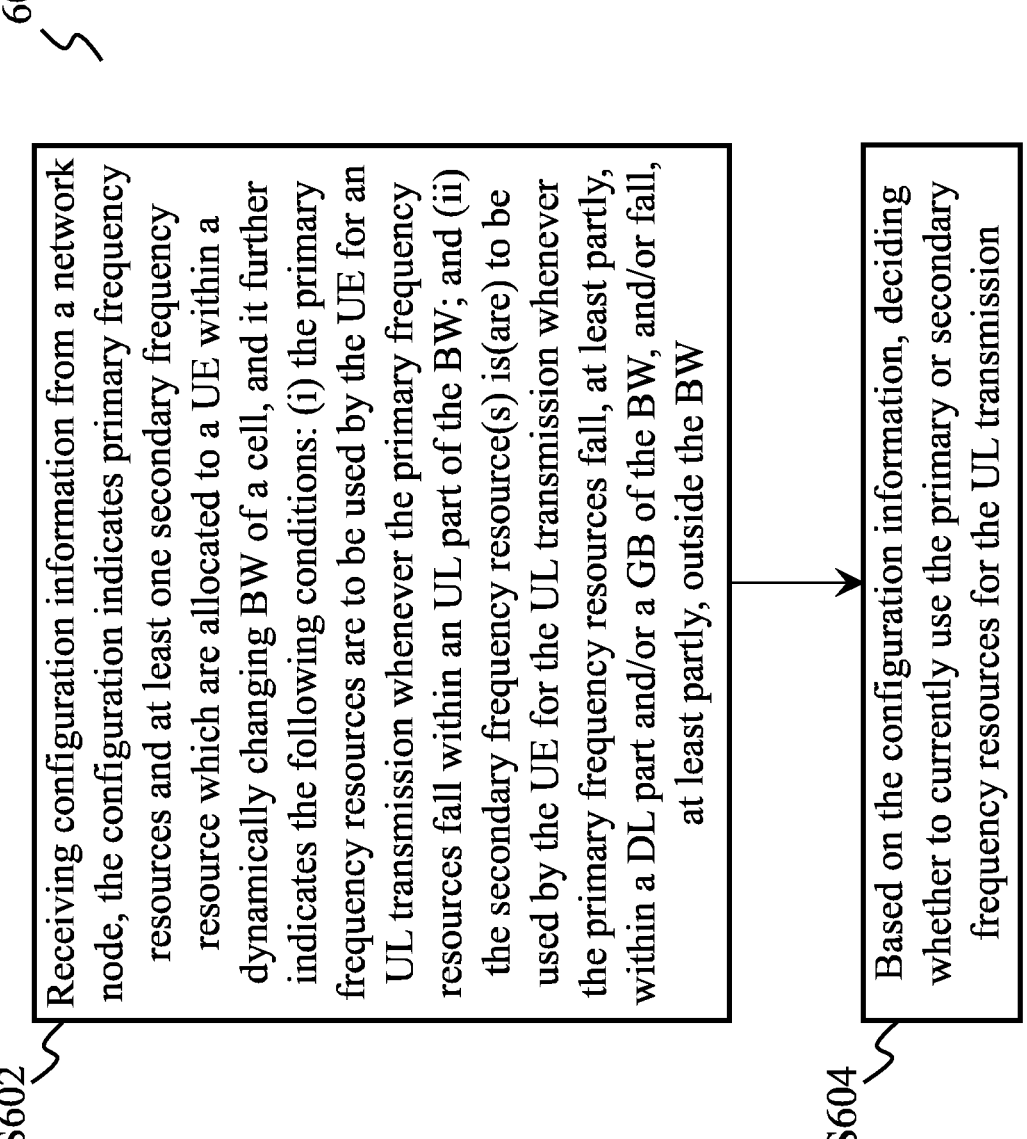

600

S602

Receiving configuration information from a network node, the configuration indicates primary frequency resources and at least one secondary frequency resource which are allocated to a UE within a dynamically changing BW of a cell, and it further indicates the following conditions: (i) the primary frequency resources are to be used by the UE for an UL transmission whenever the primary frequency resources fall within an UL part of the BW; and (ii) the secondary frequency resource(s) is(are) to be used by the UE for the UL transmission whenever the primary frequency resources fall, at least partly, within a DL part and/or a GB of the BW, and/or fall, at least partly, outside the BW

S604

Based on the configuration information, deciding whether to currently use the primary or secondary frequency resources for the UL transmission

FIG. 6

DYNAMIC ADAPTATION OF FREQUENCY RESOURCES FOR UPLINK TRANSMISSIONS WITH FLEXIBLE FREQUENCY DIVISION DUPLEXING

CROSS REFERENCE TO RELATED APPLICATION

This patent application is a U.S. National Stage application of International Patent Application Number PCT/EP2020/074329 filed Sep. 1, 2020, which is hereby incorporated by reference in its entirety.

TECHNICAL FIELD

The present disclosure relates generally to the field of wireless communications and, in particular, to techniques for dynamically adapting frequency resources for uplink (UL) transmissions with flexible Frequency Division Duplexing (FDD).

BACKGROUND

In 5G New Radio (NR), it is possible to configure UL transmissions without the need to transmit a dynamic grant from a gNB to a UE in case of each UL transmission occasion. The configuration of frequency resources for the UL transmissions, also referred to as Configured Grant (CG) Physical Uplink Shared Channel (PUSCH) resources, may be performed either via Radio Resource Control (RRC) signaling or via the RRC signaling combined with Physical Downlink Control Channel (PDCCH) signaling (e.g., Downlink Control Information (DCI) over a PDCCH). At the same time, 5G NR does not explicitly indicate how the UE should operate at a flexible FDD scheme.

In case of a Time Division Duplex (TDD) scheme, a Slot Format Indicator (SFI) is provided to the UE, which indicates how each of symbols within a time resource (e.g., a time slot) is used. In particular, the SFI indicates if a symbol is a DL symbol, or UL symbol, or flexible (F) symbol. The flexible symbol may be either an UL or DL symbol, or it may be used for switching between a DL and an UL (or vice versa). The UE is only allowed to initiate an UL transmission if CG-PUSCH time resources are configured to be in symbols indicated either as "UL" or "F"; otherwise, the UE is instructed to drop the UL transmission.

One problem occurs when GG-PUSCH frequency resources allocated to the UE either overlap with DL and/or guard band (GB) frequency resources or fall outside an available cell bandwidth (BW). In other words, this problem is caused by that the GG-PUSCH frequency resources are not fully contained in an UL part of the cell BW. Having this problem occurred, the UE may drop the UL transmission. There is also another problem in which the UE may drop the UL transmission if the CG-PUSCH time resources collide with at least one flexible FDD slot/symbol. In any case, the gNB will not have the possibility, in flexible FDD slots/symbols, to redirect UL CG allocations whose GC-PUSCH frequency resources are not entirely contained in the UL part of the cell BW. The gNB may just use dynamic scheduling to allocate new frequency resources to UEs whose UL transmissions are dropped due to said overlap; however, this will result in increased signaling overhead and reduced multiplexing capabilities of a scheduled PUSCH as compared to a CG-PUSCH.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that enables dynamical adaptation of frequency resources for UL transmissions (especially, for non-dynamically or semi-persistent scheduled UL transmissions with flexible FDD) in a wireless communication network.

The objective above is achieved by the features of the independent claims in the appended claims. Further embodiments and examples are apparent from the dependent claims, the detailed description and the accompanying drawings.

According to a first aspect, a network node for wireless communications is provided. The network node comprises a processor, a memory coupled to the processor and configured to store processor-executable instructions, and a transceiver coupled to the processor. When executed, the processor-executable instructions cause the operation of the processor. More specifically, the processor generates configuration information for a UE. The configuration information indicates primary frequency resources and at least one secondary frequency resource which are allocated to the UE within a dynamically changing BW of a cell served by the network node. The BW comprises an UL part, a DL part, and a GB between the UL part and the DL part. The configuration information further indicates the following conditions: (i) the primary frequency resources are to be used by the UE for an UL transmission whenever the primary frequency resources fall within the UL part of the BW, and (ii) the at least one secondary frequency resource is to be used by the UE for the UL transmission whenever the primary frequency resources fall, at least partly, within the DL part and/or the GB of the BW, and/or fall, at least partly, outside the BW. Once the configuration information is generated, the processor causes the transceiver to send the configuration information to the UE. By using such configuration information, the network node may configure the UE to use proper frequency resources for UL transmissions (e.g., non-dynamically or semi-persistent scheduled UL transmissions in flexible FDD slots/symbols), while limiting signaling overhead between the network node and the UE. Moreover, this configuration information may allow the network node to minimize collisions between the UL transmissions in UL slots/symbols.

In one example embodiment of the first aspect, the primary frequency resources are provided in a first time resource (e.g., a first time slot), and the at least one secondary frequency resource is selected either from the primary frequency resources or frequency resource different than the primary frequency resources, and is provided in a different second time resource (e.g., a second time slot). This may increase the flexibility and efficiency of resource allocation for the UL transmissions. In particular, this example embodiment may be useful when condition (ii) is fulfilled (i.e. the primary frequency resources, e.g., partly falls within the DL part of the BW), and an UL transmission comprises low priority traffic (e.g., with more relaxed latency constraints), for which reason the UL transmission may be delayed to a later time slot (i.e. the second time slot) where the at least one secondary frequency resource is provided.

In another example embodiment of the first aspect, the primary frequency resources are provided in a predefined time resource (e.g., a predefined time slot), and the at least one secondary frequency resource is different from the primary frequency resources but provided in the same predefined time resource. This may also increase the flexibility and efficiency of resource allocation for the UL transmissions. In particular, this example embodiment may be useful when condition (ii) is fulfilled, and an UL transmission comprises high priority traffic (e.g., with low-latency requirements), for which reason the UE should access the at least one secondary frequency resource in the same time slot to perform the UL transmission as soon as possible.

In one example embodiment of the first aspect, the UL part of the BW comprises a static UL subpart and a dynamic UL subpart, and the at least one secondary frequency resource is allocated in the static UL subpart. This may increase the flexibility and efficiency of resource allocation. More specifically, by using this example embodiment, one may ensure that the at least one secondary frequency resource will entirely fall within the UL part of the BW even if the UL part of the BW significantly changes depending on a network load in a DL or UL.

In one example embodiment of the first aspect, the configuration information further indicates that the UL transmission is to be dropped or delayed by the UE if: (iii) the UL part of the BW has a width less than a first threshold value; and/or (iv) if the UL transmission has a priority value less than a second threshold value. With optional condition (iii), the UL transmissions may be performed at the most suitable time period. For example, low priority traffic may be delayed to a second time slot if, in a first time slot, the width of the UL part of the BW is not sufficiently high to accommodate all UL transmissions, thus leaving room for those UL transmissions which comprise high priority traffic. In turn, optional condition (iv) may enable efficient prioritization of the UL transmissions from the same UE and/or different UEs.

In one example embodiment of the first aspect, the processor is further configured, after sending the configuration information, to generate BW specification indicating how the UL, the DL, and the GB are arranged in the BW for subsequent time resources. The BW specification may be configured as an enhanced Slot Format Indicator (eSFI) and/or an UL/DL BW part (BWP) switch command. After that, the processor is further configured to cause the transceiver to send the BW specification to the UE. By so doing, the network node according to the first aspect may inform the UE about upcoming changes in the BW.

According to a second aspect, a UE for wireless communications is provided. The UE comprises a processor, a memory coupled to the processor and configured to store processor-executable instructions, and a transceiver coupled to the processor. When executed, the processor-executable instructions cause the operation of the processor. More specifically, the processor causes the transceiver to receive configuration information from a network node. The configuration information indicates primary frequency resources and at least one secondary frequency resource which are allocated to the UE within a dynamically changing BW of a cell served by the network node. The BW comprises an UL part, a DL part, and a GB between the UL part and the DL part. The configuration information further indicates the following conditions: (i) the primary frequency resources are to be used by the UE for an UL transmission whenever the primary frequency resources fall within the UL part of the BW, and (ii) the at least one secondary frequency resource is to be used by the UE for the UL transmission whenever the primary frequency resources fall, at least partly, within the DL part and/or the GB of the BW, and/or fall, at least partly, outside the BW. After that, the processor uses the configuration information to decide whether to currently use the primary frequency resources or the at least one secondary frequency resource for the UL transmission. With such configuration information, the UE may dynamically adapt the frequency resources allocated by the network node to the UE for UL transmissions (e.g., for non-dynamically or semi-persistent scheduled UL transmissions in flexible FDD slots/symbols) depending on which of conditions (i) and (ii) is fulfilled, while also limiting signaling overhead between the network node and the UE.

In one example embodiment of the second aspect, the primary frequency resources are provided in a first time resource (e.g., a first time slot), and the at least one secondary frequency resource is selected from either the primary frequency resources or frequency resources different than the primary frequency resources, and is provided in a different second time resource (e.g., a second time slot). This may increase the flexibility and efficiency of resource allocation for the UL transmissions. In particular, this example embodiment may be useful when condition (ii) is fulfilled (i.e. the primary frequency resources, e.g., partly falls within the DL part or GB of the BW), and an UL transmission comprises low priority traffic (e.g., with more relaxed latency constraints), for which reason the UE may delay the UL transmission to a later time slot (i.e. the second time slot) where the at least one secondary frequency resource is provided.

In another example embodiment of the second aspect, the primary frequency resources are provided in a predefined time resource (e.g., a predefined time slot), and the at least one secondary frequency resource is different from the primary frequency resources but provided in the same predefined time resource. This may also increase the flexibility and efficiency of resource allocation for the UL transmissions. In particular, this example embodiment may be useful when condition (ii) is fulfilled, and an UL transmission comprises high priority traffic (e.g., with low latency requirements), for which reason the UE should access the at least one secondary frequency resource in the same time slot to perform the UL transmission as soon as possible.

In one example embodiment of the second aspect, the UL part of the BW comprises a static UL subpart and a dynamic UL subpart, and the at least one secondary frequency resource is allocated in the static UL subpart. This may increase the flexibility and efficiency of resource allocation. More specifically, by using this example embodiment, one may ensure that the at least one secondary frequency resource will entirely fall within the UL part of the BW even if the UL part of the BW significantly changes depending on a network load in the DL or UL.

In one example embodiment of the second aspect, the configuration information further indicates that the UL transmission is to be dropped or delayed by the UE if: (iii) the UL part of the BW has a width less than a first threshold value; and/or (iv) if the UL transmission has a priority value less than a second threshold value. With optional condition (iii), the UL transmissions may be performed at the most suitable time period. For example, low priority traffic may be delayed to a second time slot if, in a first time slot, the width of the UL part of the BW is not sufficiently high to accommodate all UL transmissions, thus leaving room for those UL transmissions which comprise high priority traffic. In turn, optional condition (iv) may enable efficient prioritization of the UL transmissions from the same UE and/or different UEs.

In one example embodiment of the second aspect, the transceiver is further configured, after receiving the configuration information, to receive BW specification indicating how the UL, the DL, and the GB are arranged in the BW for subsequent time resources. The BW specification may be configured as an eSFI and/or an UL/DL BWP switch command. With such BW specification, the UE according to the second aspect may be informed of upcoming changes in the BW.

According to a third aspect, a method for operating a network node in a wireless communication network is provided. The method starts with the step of generating configuration information for a UE. The configuration information indicates primary frequency resources and at least one secondary frequency resource which are allocated to the UE within a dynamically changing BW of a cell served by the network node. The BW comprises an UL part, a DL part, and a GB between the UL part and the DL part. The configuration information further indicates the following conditions: (i) the primary frequency resources are to be used by the UE for an UL transmission whenever the primary frequency resources fall within the UL part of the BW, and (ii) the at least one secondary frequency resource is to be used by the UE for the UL transmission whenever the primary frequency resources fall, at least partly, within the DL part and/or the GB of the BW, and/or fall, at least partly, outside the BW. The method further proceeds to the step of sending the configuration information to the UE. With such configuration information, it is possible to configure the UE to use proper frequency resources for UL transmissions (e.g., for non-dynamically or semi-persistent scheduled UL transmissions in flexible FDD slots/symbols), while limiting signaling overhead between the network node and the UE. Moreover, this configuration information may minimize collisions between the UL transmissions in UL slots/symbols.

According to a fourth aspect, a method for operating a UE in a wireless communications network is provided. The method starts with the step of receiving configuration information from a network node. The configuration information indicates primary frequency resources and at least one secondary frequency resource which are allocated to the UE within a dynamically changing BW of a cell served by the network node. The BW comprises an UL part, a DL part, and a GB between the UL part and the DL part. The configuration information further indicates the following conditions: (i) the primary frequency resources are to be used by the UE for an UL transmission whenever the primary frequency resources fall within the UL part of the BW, and (ii) the at least one secondary frequency resource is to be used by the UE for the UL transmission whenever the primary frequency resources fall, at least partly, within the DL part and/or the GB of the BW, and/or fall, at least partly, outside the BW. After that, the method proceeds to the step of deciding, based on the configuration information, whether to currently use the primary frequency resources or the secondary frequency resource(s) for the UL transmission. By so doing, the UE may dynamically adapt the frequency resources allocated by the network node to the UE for UL transmissions (e.g., for non-dynamically or semi-persistent scheduled UL transmissions in flexible FDD slots/symbols) depending on which of conditions (i) and (ii) is fulfilled, while also limiting signaling overhead between the network node and the UE.

According to a fifth aspect, a computer program product is provided. The computer program product stores a computer-readable storage medium comprising a computer code.

When executed by at least one processor, the computer code causes the at least one processor to perform the method according to the third aspect. By using such a computer program product, it is possible to simplify the implementation of the method according to the third aspect in any network node, such, for example, as the network node according to the first aspect.

According to a sixth aspect, a computer program product is provided. The computer program product stores a computer-readable storage medium comprising a computer code. When executed by at least one processor, the computer code causes the at least one processor to perform the method according to the fourth aspect. By using such a computer program product, it is possible to simplify the implementation of the method according to the fourth aspect in any computing device, such, for example, as the UE according to the second aspect.

According to a seventh aspect, a network node for wireless communications is provided. The network node comprises a processing means for generating configuration information for a UE. The configuration information indicates primary frequency resources and at least one secondary frequency resource which are allocated to the UE within a dynamically changing BW of a cell served by the network node. The BW comprises an UL part, a DL part, and a GB between the UL part and the DL part. The configuration information further indicates the following conditions: (i) the primary frequency resources are to be used by the UE for an UL transmission whenever the primary frequency resources fall within the UL part of the BW, and (ii) the at least one secondary frequency resource is to be used by the UE for the UL transmission whenever the primary frequency resources fall, at least partly, within the DL part and/or the GB of the BW, and/or fall, at least partly, outside the BW. The network node further comprises a transceiving means for sending the configuration information to the UE. By using such configuration information, the network node may configure the UE to use proper frequency resources for UL transmissions (e.g., for non-dynamically or semi-persistent scheduled UL transmissions in flexible FDD slots/symbols), while limiting signaling overhead between the network node and the UE. Moreover, this configuration information may allow the network node to minimize collisions between the UL transmissions in UL slots/symbols.

According to an eighth aspect, a UE for wireless communications is provided. The UE comprises a transceiving means for receiving configuration information from a network node. The configuration information indicates primary frequency resources and at least one secondary frequency resource which are allocated to the UE within a dynamically changing BW of a cell served by the network node. The BW comprises an UL part, a DL part, and a GB between the UL part and the DL part. The configuration information further indicates the following conditions: (i) the primary frequency resources are to be used by the UE for an UL transmission whenever the primary frequency resources fall within the UL part of the BW, and (ii) the at least one secondary frequency resource is to be used by the UE for the UL transmission whenever the primary frequency resources fall, at least partly, within the DL part and/or the GB of the BW, and/or fall, at least partly, outside the BW. The UE further comprises a processing means for deciding, based on the configuration information, whether to use the primary frequency resources or the at least one secondary frequency resource for the UL transmission at a current time resource. With such configuration information, the UE may dynamically adapt the frequency resources allocated by the network node to the UE for UL transmissions (e.g., for non-dynamically or semi-persistent scheduled UL transmissions in flexible FDD slots/symbols) depending on which of conditions (i) and (ii) is fulfilled, while also limiting signaling overhead between the network node and the UE.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which:

FIG. 3 shows a flowchart of a method for operating the network node shown in FIG. 2 in accordance with one example embodiment;

FIG. 6 shows a flowchart of a method for operating the UE shown in FIG. 5 in accordance with one example embodiment;

DETAILED DESCRIPTION

Figure 1:
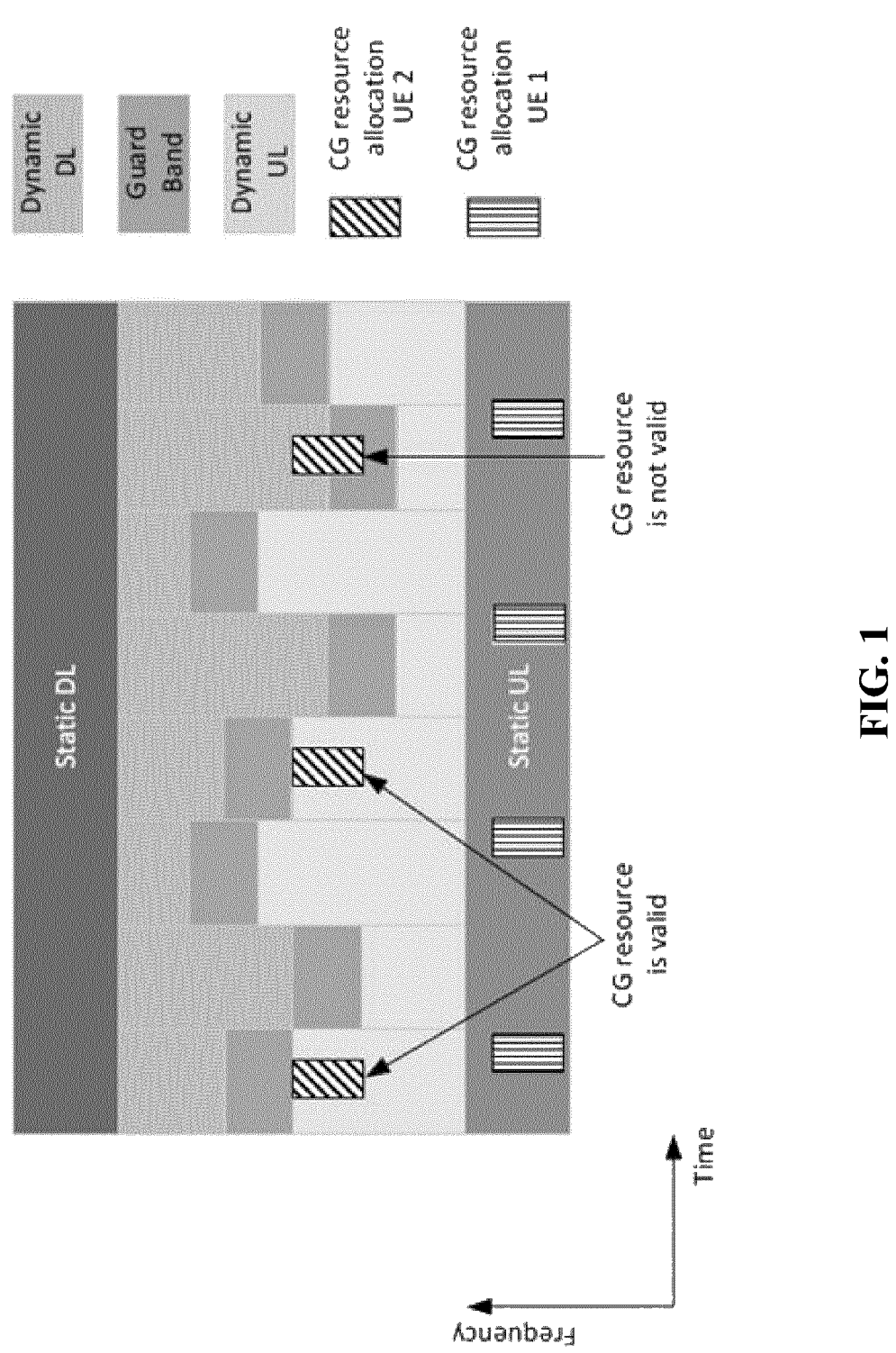
FIG. 1 explains the overall concept of flexible FDD operation in unpaired bands in accordance with the prior art.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the features presented in the appended claims.

Unless otherwise stated, any embodiment recited herein as "example embodiment" should not be construed as preferable or having an advantage over other embodiments.

According to the example embodiments disclosed herein, a user equipment or UE for short may refer to a mobile device, a mobile station, a terminal, a subscriber unit, a mobile phone, a cellular phone, a smart phone, a cordless phone, a personal digital assistant (PDA), a wireless communication device, a desktop computer, a laptop computer, a tablet computer, a gaming device, a netbook, a smartbook, an ultrabook, a medical device or medical equipment, a biometric sensor, a wearable device (for example, a smart watch, smart glasses, a smart wrist band, etc.), an entertainment device (for example, an audio player, a video player, etc.), a vehicular component or sensor, a smart meter/sensor, an unmanned vehicle (e.g., an industrial robot, a quadcopter, etc.), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable device configured to support wireless communications. In some example embodiments, the UE may refer to at least two collocated and inter-connected UEs thus defined.

As used in the example embodiments disclosed herein, a network node may relate to a fixed point of communication for the UE in a particular wireless communication network. The network node may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G New Radio (NR) communication technology. The network node may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the network node serving the macrocell may be referred to as a macro node, the network node serving the microcell may be referred to as a micro node, and so on.

According to the example embodiments disclosed herein, a wireless communication network, in which the UE and the network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

As used in the example embodiments disclosed herein, a downlink or DL for short may refer to communication from the network node to the UE in the wireless communication network. In turn, an uplink or UL for short may refer to communication from the UE to the network node in the wireless communication network.

Since the UE may use multiple communication services (e.g., different enhanced Ultra-Reliable and Low Latency Communication (eURLLC) and Time-Sensitive Communication (TSC) services) in parallel, there may be multiple UL data concurrently generated in the UE, which are to be transmitted on different frequency resources allocated by the network node to the UE. Such allocation is done via an uplink grant issued by the network node to the UE. In general, the uplink grant may be considered as information regarding the frequency resources and other transmission parameters allocated to the UE in order to transmit the UL data. There are two types of the uplink grants: dynamic grants and configured grants. A dynamic grant is issued for a specific UE through Downlink Control Information (DCI) transmitted in the PDCCH, where this DCI is scrambled with a UE identifier (ID). Then, the UE determines whether its UE ID exists in the PDCCH, and thus may know whether the dynamic grant is transmitted for the UE. The UE ID may also be referred to as Cell-Radio Network Temporary Identifier (C-RNTI). A configured grant (CG) is provided periodically and autonomously once configured, without the need to provide it dynamically. The UE may skip transmissions on one or more occurrences of the CG if it has no UL data to transmit thereon.

To provide multiple access control in the wireless communication network, a duplexing scheme may be used, which consists in providing separate communication channels for the UL and the DL in frequency (known as Frequency Division Duplexing (FDD)), time (known as Time Division Duplexing (TDD)), and space (known as Space Division Duplexing (SDD)). The FDD allows UL and the DL transmissions at the same time, but over different frequency bands (known as paired bands), with these bands being typically separated by a large margin (known as a Guard Band (GB)) to avoid leakage. The TDD allows the UL and the DL to use the entire frequency spectrum (known as an unpaired band), but in different time slots. The SDD relies on the network node and UE being equipped with multiple antennas and the creation of orthogonal spatial modes for the UL and the DL.

FDD solutions for the unpaired bands are needed to better fulfil requirements for the evolving eURLLC and TSC services. Such solutions should remove the undesirable restriction of traditional TDD usage for the unpaired bands that prevent concurrent UL and DL transmissions, and therefore severely limit the eURLLC/TSC performance especially from the communication latency point of view. Flexible FDD operation in the unpaired bands is not yet defined in the NR specifications. With the flexible FFD operation, the network node (i.e. gNB in terms of 5G NR) may dynamically use a part of the spectrum for the UL or DL transmissions, as well as simultaneously transmit and receive on the unpaired band, assuming there is a minimum frequency separation between the UL and DL (i.e. the GB). The flexible FDD operation may allow the latency associated with TDD operation within the unpaired band to be mitigated, while avoiding the problem of intra-cell cross-link interference associated with in-band Full Duplex operation.

FIG. 1 explains the overall concept of the flexible FDD operation in the unpaired bands in accordance with the prior art. As shown in FIG. 1, a BW of a cell, in which the flexible FDD operation is used, may be divided into static DL and UL subparts, dynamic DL and UL subparts, and a GB. When periodic CG frequency resources are allocated in the static UL subpart of the BW (as it is done for UE 1 in FIG. 1), the whole operation of UE 1 is the same as in case of the TDD operation. However, when the periodic CG frequency resources are instead allocated in the dynamic UL subpart (as it is done for UE 2 in FIG. 1), and when this allocation is fixed in a frequency domain, then the CG frequency resources may not always be available to be used for UL transmissions because of their at least partial and temporary overlap with frequency resources used for the DL subpart and/or the GB. In this case, UE 2 will drop the UL transmissions whenever the allocated frequency resources fall, at least partly, within the DL subpart and/or the GB.

Additionally, the UL transmissions may undesirably be dropped when the dynamic modification of the DL and UL frequency resources split with the flexible FDD is done via a corresponding DL/UL BW part (BWP) switch. In this case, as CG-PUSCH frequency resources are related to the start of an active UL BWP, a partial overlap between the CG-PUSCH frequency resources and DL and/or GB frequency resources is only possible if the UL part of the BW of the cell is in the upper part of the BW. If the UL part of the BW is in the lower part of the BW (which is the case shown in FIG. 1), there is another problem that may occur: at least some of the CG-PUSCH frequency resources may fall out of the BW of the cell. In this case, it seems obvious that the UL transmissions with at least some of the CG-PUSCH frequency resources falling out of the available BW of the cell should be dropped.

Thus, based on the prior art solutions, the UE would drop the UL transmissions whenever the allocated frequency resources at least partly overlap with the DL and/or GB frequency resources, and/or fall outside of the available BW of the cell.

To avoid the above-mentioned cases of the dropped UL transmissions, the network node could allocate the CG-PUSCH frequency resources to the UE such that they will surely never fall out of the available BW of the cell or collide with the frequency resources of the DL part or the GB. The main drawback of this approach is that it causes an inefficient use of the available frequency resources as it basically consists in confining the GC-PUSCH frequency resources in a part of the BW corresponding to the size of the static UL subpart.

The example embodiments disclosed herein provide a technical solution that allows mitigating or even eliminating the above-sounded drawbacks peculiar to the prior art. In particular, the technical solution disclosed herein involves allocating, by the network node, primary frequency resources and at least one secondary frequency resource to the UE within the dynamically changing BW of the cell served by the network node. The network node further configures the UE to use the primary frequency resources for an UL transmission whenever the primary frequency resources fall within the UL part of the BW, and to use the at least one secondary frequency resource for the UL transmission whenever the primary frequency resources fall, at least partly, within the DL part and/or the GB of the BW, and/or fall, at least partly, outside the BW. Thus, the UE may dynamically, based on such configuration from the network node, adapt its resource allocation to perform the UL transmission even if the primary frequency resources are not fully within the UL part of the BW in a current time slot. By so doing, it is also possible to provide limited signaling overhead between the network node and the UE, as well as to minimize collisions between UL transmissions in UL slots/symbols.

Figure 2:
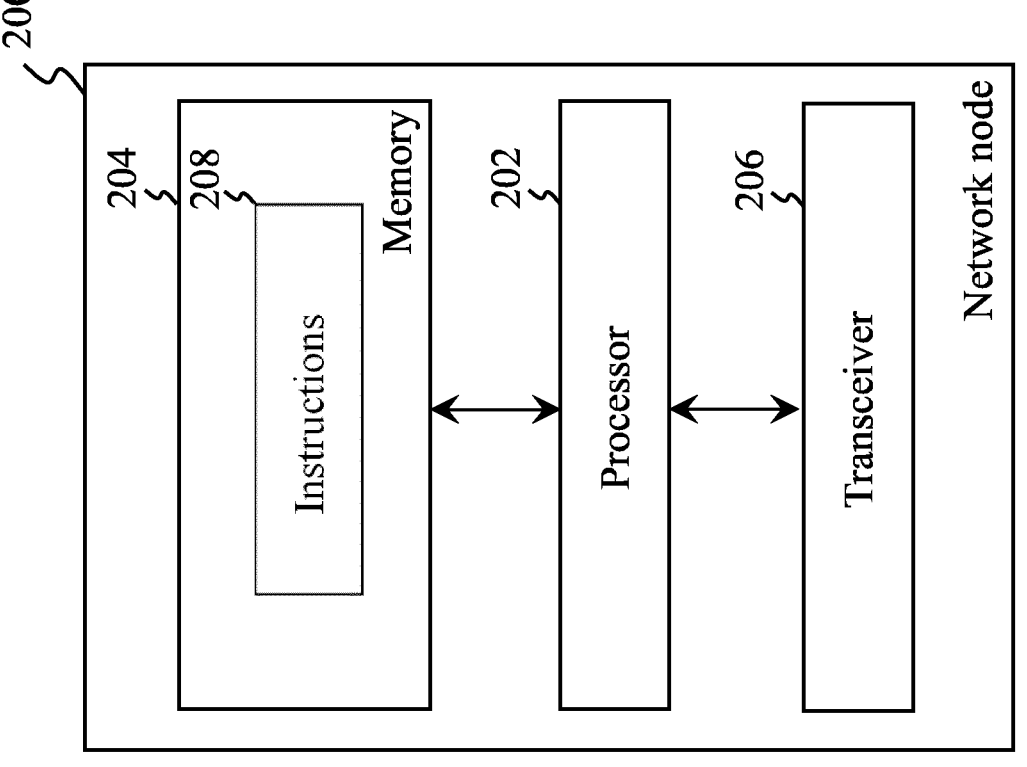
FIG. 2 shows a general block-scheme of a network node in accordance with one example embodiment.

FIG. 2 shows a general block-scheme of a network node 200 in accordance with one example embodiment. The network node 200 is intended to be deployed in any of the above-described wireless communication networks. As shown in FIG. 2, the network node 200 comprises a processor 202, a memory 204, and a transceiver 206. The memory 204 stores processor-executable instructions 208 which, when executed by the processor 202, cause the processor 202 to issue UE configuration information, as will be described below in more detail. It should be noted that the number, arrangement and interconnection of the constructive elements constituting the network node 200, which are shown in FIG. 2, are not intended to be any limitation of the present disclosure, but merely used to provide a general idea of how the constructive elements may be implemented within the network node 200. For example, the processor 202 may be replaced with several processors, as well as the memory 204 may be replaced with several removable and/or fixed storage devices, depending on particular applications. Furthermore, the transceiver 206 may be implemented as two individual devices, with one for a receiving operation and another for a transmitting operation. Irrespective of its implementation, the transceiver 206 is intended to be capable of performing different operations required to perform the data reception and transmission, such, for example, as signal modulation/demodulation, encoding/decoding, etc.

The processor 202 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 202 may be implemented as any combination of one or more of the aforesaid. As an example, the processor 202 may be a combination of two or more microprocessors.

The memory 204 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 208 stored in the memory 204 may be configured as a computer-executable code which causes the processor 202 to perform the aspects of the present disclosure. The computer-executable code for carrying out operations or steps for the aspects of the present disclosure may be written in any combination of one or more programming languages, such as Java, C++, or the like. In some examples, the computer-executable code may be in the form of a high-level language or in a pre-compiled form and be generated by an interpreter (also pre-stored in the memory 204) on the fly.

FIG. 3 shows a flowchart of a method 300 for operating the network node 200 in accordance with one example embodiment. In the method 300, the network node 100 is intended to communicate with a certain UE in accordance with the flexible FDD, and the UE has data generated for different communication services (e.g., the eURLLC and/or TSC services) and waiting for their transmission to the network node and/or to any other UE(s). The method 300 starts with a step S302, in which the processor 202 generates configuration information for the UE. The configuration information indicates primary frequency resources and one or more secondary frequency resources which are allocated to the UE within a dynamically changing BW of a cell served by the network node 200. As noted earlier, in case of the flexible FDD, the BW comprises an UL part, a DL part, and a GB between the UL part and the DL part. The configuration information further indicates the following conditions: (i) the primary frequency resources are to be used by the UE for an UL transmission whenever the primary frequency resources fall within the UL part of the BW, and (ii) the at least one secondary frequency resource is to be used by the UE for the UL transmission whenever the primary frequency resources fall, at least partly, within the DL part and/or the GB of the BW, and/or fall, at least partly, outside the BW. The method 300 further proceeds to a step S304, in which the processor 202 causes the transceiver 206 to send the configuration information to the UE.

Figure 4:
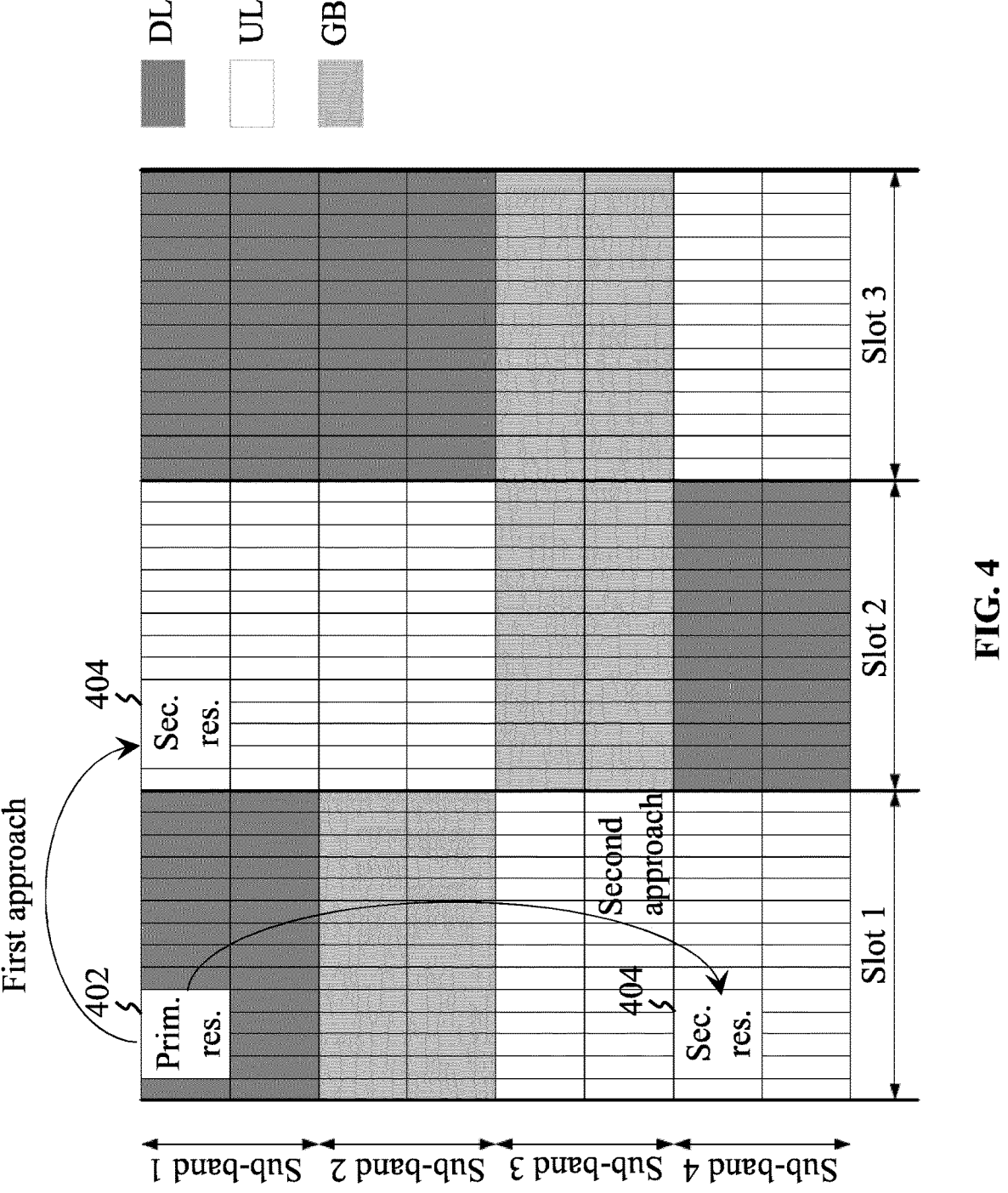
FIG. 4 shows two approaches for resource allocation performed by the network node shown in FIG. 2 in accordance with one example embodiment.

FIG. 4 shows two approaches for resource allocation performed by the network node 200 in accordance with one example embodiment. Before proceeding to the description of these approaches, it should be noted that the whole BW of the cell is assumed to consist of frequency sub-bands 1-4 which constitute the UL part, the DL part and the GB of the BW differently for each of time resources represented by time slots 1-3 shown in FIG. 4. More specifically, the DL part is shown in dark gray, the GB is shown in light gray, and the UL part is shown in white within times slots 1-3. Those skilled in the art would recognize that the BW configuration shown in FIG. 4 is illustrative and, therefore, should not be considered as any limitation of the present disclosure. Such BW configuration is selected only for the sake of simplicity. It is also worth noting that there may be sub-frames or frames used instead of the time slots shown in FIG. 4. In general, the time resources used herein may refer to any time periods that may be used by the network node 200 of the wireless communication network in order to allocate the frequency resources to the UE.

According to the first approach, the processor 202 of the network node 200 allocates, before or during the step S302 of the method 300, primary frequency resources 402 in time slot 1, and then selects at least one secondary frequency resource 404 from among the primary frequency resources 402 but allocates the secondary frequency resource (s) 404 in time slot 2. Alternatively, the processor 202 may also select the secondary frequency resource(s) 404 from available frequency resources different than the primary frequency resources 402, and allocate the secondary frequency resource(s) 404 in time slot 2. The first approach may be used when condition (ii) is fulfilled for time slot 1 (i.e. the primary frequency resources 402 fully falls within the DL part of the BW), and the UL transmission comprises low priority traffic (e.g., with more relaxed latency constraints). For this reason, the UL transmission may be delayed to time slot 2 where the secondary frequency resource(s) 404 is(are) provided.

According to the second approach, the processor 202 of the network node 200 allocates, before or during the step S302 of the method 300, primary frequency resources 402 in time slot 1, and then selects the secondary frequency resource(s) 404 from among frequency resources different than the primary frequency resources 402 in the same time slot. The second approach may be used when condition (ii) is fulfilled for time slot 1 (i.e. the primary frequency resources 402 fully fall within the DL part of the BW), and the UL transmission comprises high priority traffic (e.g., with low latency requirements). For this reason, the UE should access the secondary frequency resource(s) 404 in the same time slot to perform the UL transmission as soon as possible.

It should be noted that the BW is shown in FIG. 4 with its static UL and DL subparts excluded from consideration. In one example embodiment, the processor 202 may allocate the secondary frequency resource(s) 404 in the static UL subpart of the BW in the same time slot where the primary frequency resources 402 are provided, or in a different (later) time slot. In turn, the static UL part of the BW may correspond to a cell default UL BWP. This example embodiment may additionally increase the flexibility and efficiency of the resource allocation.

In one example embodiment, the processor 202 may add, in the step S302 of the method 300, at least one of the following optional conditions to the configuration information:

(iii) the UL transmission is to be dropped or delayed by the UE if the UL part of the BW has a width less than a first threshold value (with this additional condition, the UL transmissions may be performed at the most suitable time period, i.e. when the dynamically changing BW of the cell has a proper width); and (iv) the UL transmission is to be dropped or delayed by the UE if the UL transmission has a priority value less than a second threshold value (this additional condition may enable efficient prioritization of UL transmissions from the same UE and/or different UEs).

In one example embodiment, the processor 202 is further configured, after sending the configuration information, to generate BW specification indicating how the UL, the DL, and the GB are arranged in the BW for subsequent time resources. The BW specification may be configured as an eSFI and/or an UL/DL BWP switch command. More specifically, the eSFI may indicate, for each time slot, which fractions of the BW are used for the UL, the DL and the GB. The UL/DL BWP switch command may indicate that current characteristics/properties (e.g., a BWP width) of a certain BWP that, for example, corresponds to the UL or the DL are to be updated to new values. A simple example is that the BWP width in frequency is changed from width A to width B, where width A>width B. After that, the processor 202 is further configured to cause the transceiver 206 to send the BW specification to the UE. By so doing, the network node 200 may inform the UE about upcoming changes in the BW.

Figure 5:
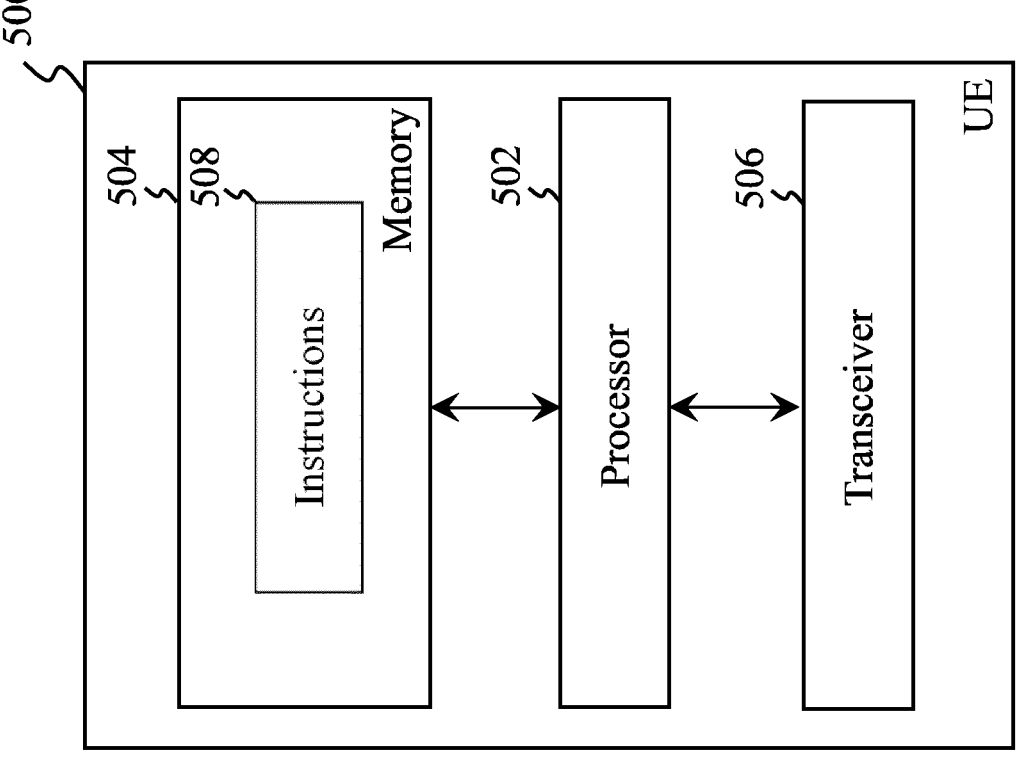
FIG. 5 shows a general block-scheme of a UE for wireless communications in accordance with one example embodiment.

FIG. 5 shows a general block-scheme of a UE 500 for wireless communications in accordance with one example embodiment. In particular, the UE 500 is intended to communicate with the network node 200 in any of the above-described wireless communication networks. As shown in FIG. 5, the UE 500 comprises a processor 502, a memory 504, and a transceiver 506. The memory 504 stores processor-executable instructions 508 which, when executed by the processor 502, cause the processor 502 to operate, as will be described below in more detail. It should be noted that the number, arrangement and interconnection of the constructive elements constituting the UE 500, which are shown in FIG. 5, are not intended to be any limitation of the present disclosure, but merely used to provide a general idea of how the constructive elements may be implemented within the UE 500. For example, the processor 502 may be replaced with several processors, as well as the memory 504 may be replaced with several removable and/or fixed storage devices, depending on particular applications. Furthermore, the transceiver 506 may be implemented as two individual devices, with one for a receiving operation and another for a transmitting operation. Irrespective of its implementation, the transceiver 506 is intended to be capable of performing different operations required to perform the data reception and transmission, such, for example, as signal modulation/demodulation, encoding/decoding, etc. In general, the processor 502, the memory 504 and the executable instructions 510 may be implemented in the same or similar manner as the processor 202, the memory 204 and the executable instructions 208, respectively, in the network node 200.

FIG. 6 shows a flowchart of a method 600 for operating the UE 500 in accordance with one example embodiment. The method 600 starts with a step S602, in which the processor 502 causes the transceiver 506 to receive the configuration information from the network node 200, i.e. the transceiver 206. As noted above, the configuration information indicates the primary frequency resources and the secondary frequency resource(s) which are allocated to the UE 500 within the dynamically changing BW of the cell served by the network node 200. For example, the resource allocation may be performed in accordance with one of the two approaches described above with reference to FIG. 4, whereupon the primary frequency resources may be represented by the primary frequency resources 402 and the secondary frequency resource(s) may be represented by the secondary frequency resource(s) 404 in the same time slot or a different time slot. As also noted above, the configuration information further indicates the following conditions: (i) the primary frequency resources are to be used by the UE for the UL transmission whenever the primary frequency resources fall within the UL part of the BW, and (ii) the secondary frequency resource(s) is(are) to be used by the UE for the UL transmission whenever the primary frequency resources fall, at least partly, within the DL part and/or the GB of the BW, and/or fall, at least partly, outside the BW. After that, the method 600 proceeds to a step S604, in which the processor 502 uses the configuration information to decide whether to currently use the primary frequency resources or the secondary frequency resource(s) for the UL transmission. With such configuration information, the UE may dynamically adapt the frequency resources allocated by the network node to the UE for UL transmissions (e.g., in flexible FDD slots/symbols) depending on which of conditions (i) and (ii) is fulfilled, while also limiting signaling overhead between the network node and the UE.

Figure 7:
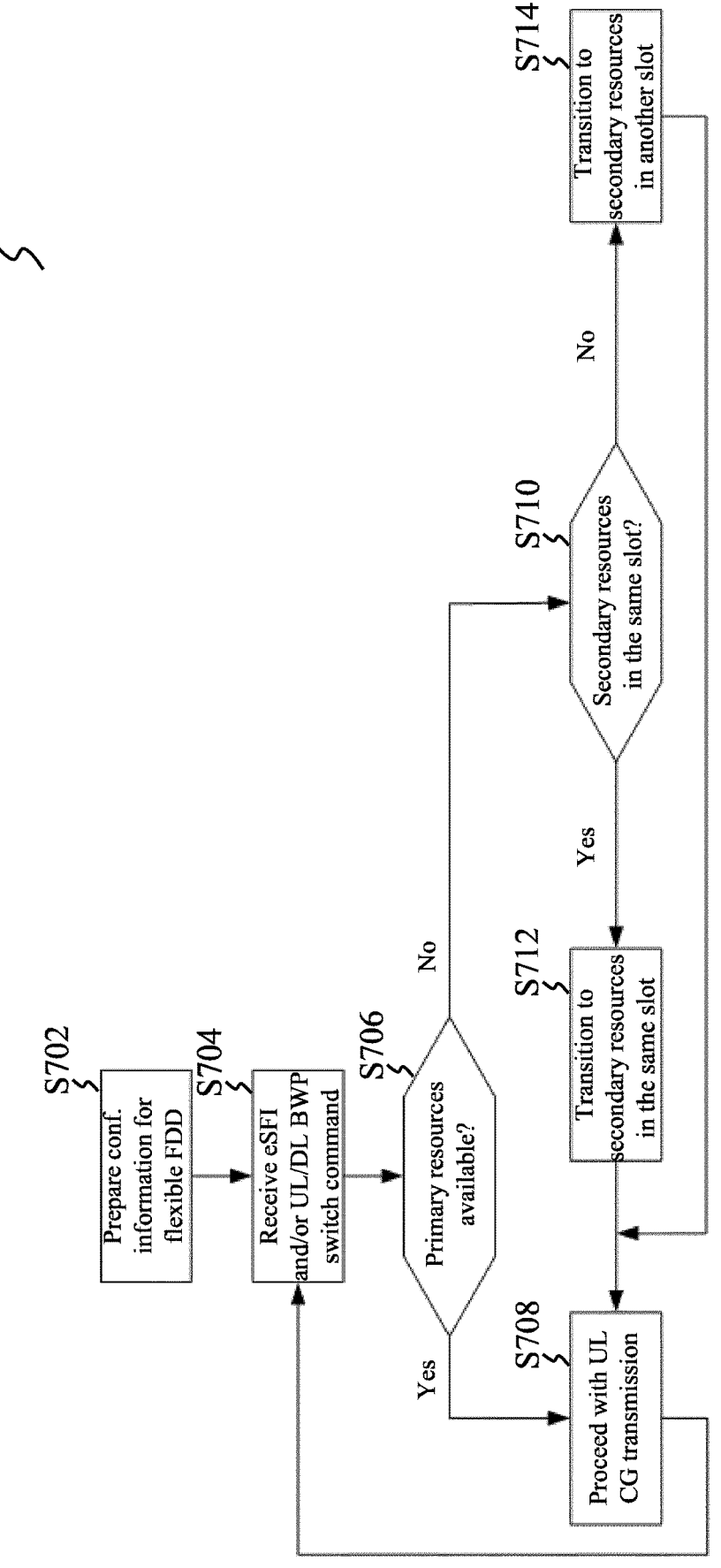
FIG. 7 shows an interaction diagram that explains the interactive behavior of the network node shown in FIG. 2 and the UE show in FIG. 5 in accordance with one example embodiment.

FIG. 7 shows an interaction diagram 700 that explains the interactive behavior of the network node 200 and the UE 500 in accordance with one example embodiment. The interaction diagram 700 starts with a step S702, in which the network node 200 prepares and send the configuration information to the UE 500 operating in accordance with the flexible FDD. The step S702 substantially embodies the method 300 performed by the network node 200 to configure the UE 500 with the above-described configuration information. Then, the interaction diagram 700 proceeds to a step S704, in which the UE 500 receives an eSFI and/or UL/DL BWP switch command from the network node 200. As noted earlier, the eSFI and/or UL/DL BWP switch command are/is used to indicate, to the UE 500, which part of the BW is intended for the UL, DL and GB in corresponding slots/symbols. Further, a next step S706 is initiated, in which the UE 500 determines whether the primary CG-PUSCH resources are available or valid for a current time slot, i.e. if condition (i) or (ii) is fulfilled. If the primary frequency resources are part of the UL part of the BW of the cell served by the network node 200 (i.e. condition (i) is fulfilled), then UE 500 uses the primary frequency resources to perform the UL transmission over a CG-PUSCH in a step S708. However, if condition (ii) is in force (e.g., the primary frequency resources fully fall within the DL part of the BW, as is the case in slot 1 in FIG. 4), the interaction diagram 700 proceeds to a step 710, in which the UE 500 checks if the secondary frequency resource(s) is(are) allocated by the network node 200 in the same time resource as the primary frequency resources or not. If the secondary frequency resource(s) is(are) in the same time slot, the UE 500 transitions to the secondary frequency resource(s) in the same time slot in a step S712 and then returns to the step S708 to perform the UL transmission over the CG-PUSCH by using the secondary frequency resource(s). However, if there is no secondary frequency resource in the same time slot, the UE 500 is not allowed to transmit in this slot and could either drop the UL transmission or delay the UL transmission to a later time slot where the secondary frequency resource(s) is(are) provided, i.e. the interaction diagram 700 goes to a step S714. In the step S714, the UE 500 transitions to the secondary frequency resource(s) provided in the later time slot, and then returns to the step S708 to perform the UL transmission over the CG-PUSCH by using the secondary frequency resource(s).

It should be noted that, if the configuration information further comprises conditions (iii) and (iv), then the UE 500 also needs to check, before the step S708 (i.e. before performing the UL transmission over the primary or secondary frequency resources), that the width of the UL part of the available BW is larger than or equal to the first threshold value, and the priority of the UL transmission is above the second threshold value. If the width of the UL part of the BW is less than the first threshold value and/or the priority of the UL transmission (i.e. the UL traffic to be transmitted) is less than the second threshold value, the UE 500 is not allowed to transmit in this slot and may either drop or delay the UL transmission to a later time slot.

In general, the steps S704-S714 of the interaction diagram 700, which characterize the operation of the UE 500, may be presented as the following pseudocode:

```
Check if primary resources is in UL BW:
    Yes -> check if UL BW > Threshold1 OR priority > Threshold2:
        Yes -> transmit on primary resources,
        No - > do not transmit in this slot (drop or check later slots);
    No → check if at least one of secondary resource is in UL BW:
        Yes -> check if UL BW > Threshold1 OR priority > Threshold2:
            Yes -> transmit on secondary CG-PUSCH,
            No -> do not transmit in this slot (drop or check later slots).
```

It should be noted that each step or operation of the methods 300, 600 and the interaction diagram 700, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processors 202 and 502. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A network node for wireless communications, comprising:

at least one processor;

at least one transmitter coupled to the at least one processor;

at least one non-transitory memory storing instructions that, when executed with the at least one processor, cause the at least one transmitter to:

generate configuration information for a user equipment, the configuration information indicating primary frequency resources and at least one secondary frequency resource which are allocated to the user equipment within a dynamically changing bandwidth of a cell served with the network node, the bandwidth comprising an uplink part, a downlink part, and a guard band between the uplink part and the downlink part, and the configuration information further indicating that:

the primary frequency resources are to be used with the user equipment for an uplink transmission when the primary frequency resources fall within the uplink part of the bandwidth; and the at least one secondary frequency resource is to be used with the user equipment for the uplink transmission when the primary frequency resources fall, at least partly, within at least one of the downlink part or the guard band of the bandwidth, or fall, at least partly, outside the bandwidth; and send the configuration information to the user equipment, wherein the primary frequency resources are provided in a predefined time resource, and wherein the at least one secondary frequency resource is different from the primary frequency resources but provided in the same predefined time resource.

2. A user equipment for wireless communications, comprising:

at least one processor; and at least one non-transitory memory storing instructions that, when executed with the at least one processor, cause the user equipment to:

receive configuration information from a network node, the configuration information indicating primary frequency resources and at least one secondary frequency resource which are allocated to the user equipment within a dynamically changing bandwidth of a cell served with the network node, the bandwidth comprising an uplink part, a downlink part, and a guard band between the uplink part and the downlink part, and the configuration information further indicating that:

the primary frequency resources are to be used with the user equipment for an uplink transmission when the primary frequency resources fall within the uplink part of the bandwidth; and the at least one secondary frequency resource is to be used with the user equipment for the uplink transmission when the primary frequency resources fall, at least partly, within at least one of the downlink part or the guard band of the bandwidth, or fall, at least partly, outside the bandwidth; and based on the configuration information, decide whether to currently use the primary frequency resources or the at least one secondary frequency resource for the uplink transmission, wherein the primary frequency resources are provided in a predefined time resource, and wherein the at least one secondary frequency resource is different from the primary frequency resources but provided in the same predefined time resource.

\* \* \* \* \*